US008390449B2

(12) United States Patent
Toyohara et al.

(10) Patent No.: US 8,390,449 B2
(45) Date of Patent: Mar. 5, 2013

(54) INTRUSION DETECTION SYSTEM AND SENSOR DEVICE THEREOF

(75) Inventors: Akihiro Toyohara, Tokyo (JP); Keisuke Morita, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 419 days.

(21) Appl. No.: 12/851,961

(22) Filed: Aug. 6, 2010

(65) Prior Publication Data

US 2011/0234404 A1 Sep. 29, 2011

(30) Foreign Application Priority Data

Mar. 23, 2010 (JP) ................................ 2010-065904

(51) Int. Cl.
*G01B 13/18* (2006.01)

(52) U.S. Cl. ........ 340/552; 340/553; 340/505; 340/554; 375/132; 375/148; 375/239; 370/503; 324/207.26

(58) Field of Classification Search .................. 375/132, 375/148, 239, 272, 306, 344, 346, 347; 340/505, 340/551–555, 517, 531, 565, 567, 568.2; 370/503; 324/207.26
See application file for complete search history.

(56) References Cited

U.S. PATENT DOCUMENTS

| | | | | |
|---|---|---|---|---|
| 4,562,428 | A * | 12/1985 | Harman et al. | 340/552 |
| 6,078,609 | A | 6/2000 | Nago | |
| 7,019,648 | B2 * | 3/2006 | Gagnon | 340/552 |
| 2007/0152818 | A1 | 7/2007 | Sato | |
| 2007/0285233 | A1 | 12/2007 | Inomata et al. | |

FOREIGN PATENT DOCUMENTS

| | | | |
|---|---|---|---|
| JP | 60-052789 | A | 3/1985 |
| JP | 01206747 | A | 8/1989 |
| JP | 09172394 | A | 6/1997 |
| JP | 2001168771 | A | 6/2001 |
| JP | 2002320271 | A | 10/2002 |
| JP | 2003256070 | A | 9/2003 |
| JP | 2004-306909 | A | 11/2004 |
| JP | 2007-179401 | A | 7/2007 |
| JP | 2007327883 | A | 12/2007 |

OTHER PUBLICATIONS

Japanese Office Action (Notification of Reason for Refusal) dated Apr. 9, 2012, issued in corresponding Japanese Patent Application No. 2010-065904. (6 pages).

* cited by examiner

*Primary Examiner* — George Bugg
*Assistant Examiner* — Sharmin Akhter
(74) *Attorney, Agent, or Firm* — Buchanan Ingersoll & Rooney PC

(57) ABSTRACT

A intrusion detection system includes a first sensor device having a first transmission circuit unit that transmits a modulation wave of a first transmission spectrum diffusion signal to a first transmission leakage transfer passage and a second sensor device having a second transmission circuit unit that transmits a modulation wave of a second transmission spectrum diffusion signal to a second transmission leakage transfer passage. The signal interval of the first transmission spectrum diffusion signal is the same as the signal interval of the second transmission spectrum diffusion signal. The first transmission spectrum diffusion signal and the second transmission spectrum diffusion signal are shifted in frequency so that the first transmission spectrum diffusion signal does not overlap with the second transmission spectrum diffusion signal.

15 Claims, 11 Drawing Sheets

INTRUSION DETECTION SYSTEM AND SENSOR DEVICE THEREOF

BACKGROUND OF THE INVENTION

1. Field of the Invention

The present invention relates to an electric wave-based intrusion detection system, in which leakage transfer passages for transmitting and receiving an electric wave are disposed in an area subject to monitoring an intrusion or a boundary thereof so as to monitor an intrusion of a person or other objects which should be monitored into the area subject to monitoring an intrusion or the boundary thereof using an electric wave, and a sensor device thereof.

2. Background Art

In an electric wave-based intrusion detection system according to the related art, a sensor device outputs a reference spectrum diffusion signal generated from a reference clock signal through a transmission leakage transfer passage. The sensor device correlates a spectrum diffusion signal received by a reception leakage transfer passage with the reference spectrum diffusion signal having a delay corresponding to a measurement distance of an intruding object to obtain a correlation signal. The sensor device detects the intruding object when a fluctuation in the signal level of the correlation signal is equal to or larger than a preset value (See JP-A-2004-306909 (FIGS. 1 to 3 and description thereof) and JP-A-2007-179401 (FIG. 4 and description thereof)).

When an intrusion of a person or other objects which should be monitored into an intrusion monitoring area or a boundary thereof is monitored using plural sets of intruder detection systems, the intruder detection system according to the related art has the following problem. That is, there is a case where both a spectrum diffusion signal output from a transmission leakage transfer passage of one intruder detection system and a spectrum diffusion signal transmitted from a transmission leakage transfer passage of another nearby intruder detection system are received by a reception leakage transfer passage. In such a case, a mutual interference may take place between the received spectrum diffusion signals, thus causing a detection error. However, in the process of developing the present invention, the present inventors have found that the detection error can be eliminated by separating the transmission leakage transfer passage of one intruder detection system from the reception leakage transfer passage of another nearby intruder detection system. Nevertheless, although the detection error can be eliminated by separating the transmission leakage transfer passage of one intruder detection system from the reception leakage transfer passage of another nearby intruder detection system, it was also found that an area in which it is difficult to detect an intrusion of an object which should be monitored is formed.

For example, as shown in FIG. 16, in order to prevent the detection error, when a separation distance of d is provided between the respective starting ends of a transmission leakage transfer passage 13*a* and a reception leakage transfer passage 15*a* connected to a sensor device 21*a* and the respective starting ends of a transmission leakage transfer passage 13*b* and a reception leakage transfer passage 15*b* connected to a sensor device 21*b*, a non-detectable area NDA is formed between both starting ends. Similarly, when a separation distance of d is provided between the respective terminating ends of the transmission leakage transfer passage 13*a* and the reception leakage transfer passage 15*a* connected to the sensor device 21*a* and the respective terminating ends of the transmission leakage transfer passage 13*b* and the reception leakage transfer passage 15*b* connected to the sensor device 21*b*, a non-detectable area NDA is formed between both terminating ends. Therefore, there is a problem in that it is difficult to prevent an intrusion of an object which should be monitored into an intrusion monitoring area from the non-detectable area NDA between both starting ends and the non-detectable area NDA between both terminating ends as indicated by empty arrows.

The interference is remarkable when the signal interval of the spectrum diffusion signal output from the transmission leakage transfer passage of one intruder detection system is the same as the signal interval of the spectrum diffusion signal transmitted from the transmission leakage transfer passage of another nearby intruder detection system. Furthermore, the interference also occurs even when the signal intervals of both spectrum diffusion signals are different from each other.

SUMMARY OF THE INVENTION

The present invention has been made in view of the circumstance described above and aims to prevent a detection error of the sensor devices when an intrusion of a person or other objects which should be monitored into an intrusion monitoring area or a boundary thereof is monitored using plural sets of intruder detection systems, and even when at least a part of a transmission leakage transfer passage of one intruder detection system is installed at a position close to at least a part of a transmission leakage transfer passage of another intruder detection system.

According to an aspect of the invention, there is provided an intrusion detection system which includes a first sensor device and a second sensor device. The first sensor device includes a first transmission circuit unit that transmits a modulation wave of a first transmission spectrum diffusion signal to a first transmission leakage transfer passage, and a first reception circuit unit that receives the modulation wave of the first transmission spectrum diffusion signal having leaked from the first transmission leakage transfer passage to a first reception leakage transfer passage so as to detect an intrusion of an object to be detected into an area subject to monitoring for an intrusion of an object to be detected on the basis of the received modulation wave. The second sensor device includes a second transmission circuit unit that transmits a modulation wave of a second transmission spectrum diffusion signal to a second transmission leakage transfer passage, and a second reception circuit unit that receives the modulation wave of the second transmission spectrum diffusion signal having leaked from the second transmission leakage transfer passage to a second reception leakage transfer passage so as to detect an intrusion of an object to be detected into an area subject to monitoring for an intrusion of an object to be detected on the basis of the received modulation wave. A signal interval of the first transmission spectrum diffusion signal is the same as a signal interval of the second transmission spectrum diffusion signal. The first transmission spectrum diffusion signal and the second transmission spectrum diffusion signal are shifted in frequency so that the first transmission spectrum diffusion signal does not overlap with the second transmission spectrum diffusion signal.

According to the present invention, the intrusion detection system includes the first sensor device which includes the first transmission circuit unit that transmits the modulation wave of the first transmission spectrum diffusion signal to the first transmission leakage transfer passage, and the first reception circuit unit that receives the modulation wave of the first transmission spectrum diffusion signal having leaked from the first transmission leakage transfer passage to the first reception leakage transfer passage so as to detect an intrusion of an object which should be detected into an area subject to monitoring an intrusion of the detected object on the basis of the received modulation wave. The intrusion detection system also includes the second sensor device which includes the second transmission circuit unit that transmits the modulation wave of the second transmission spectrum diffusion signal to the second transmission leakage transfer passage, and the second reception circuit unit that receives the modulation wave of the second transmission spectrum diffusion signal having leaked from the second transmission leakage transfer passage to the second reception leakage transfer passage so as to detect an intrusion of an object to be detected into an area subject to monitoring for an intrusion of an object to be detected on the basis of the received modulation wave. The signal interval of the first transmission spectrum diffusion signal is the same as the signal interval of the second transmission spectrum diffusion signal. The first transmission spectrum diffusion signal and the second transmission spectrum diffusion signal are shifted in frequency so that the first transmission spectrum diffusion signal does not overlap with the second transmission spectrum diffusion signal. Therefore, when an intrusion of a person or other objects which should be monitored into an intrusion monitoring area or a boundary thereof is monitored using plural sets of intruder detection systems, and even when at least a part of a transmission leakage transfer passage of one intruder detection system is installed at a position close to at least a part of a transmission leakage transfer passage of another intruder detection system, it is possible to prevent a detection error of the sensor devices.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

First Embodiment

Figure 1:
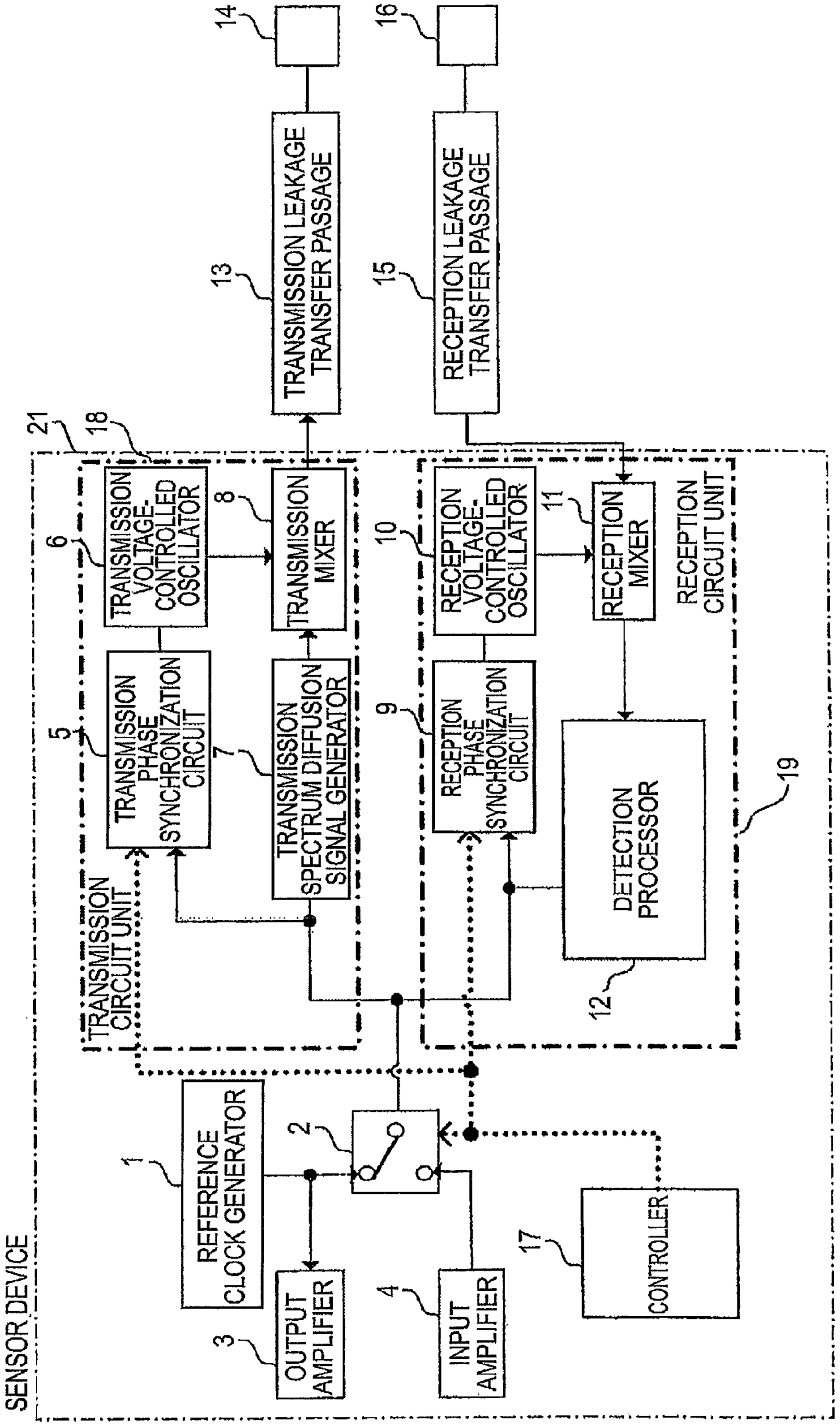
FIG. 1 is a block diagram illustrating an internal configuration of an example of a sensor device used in an intrusion detection system according to the first embodiment of the present invention.
Figure 2:
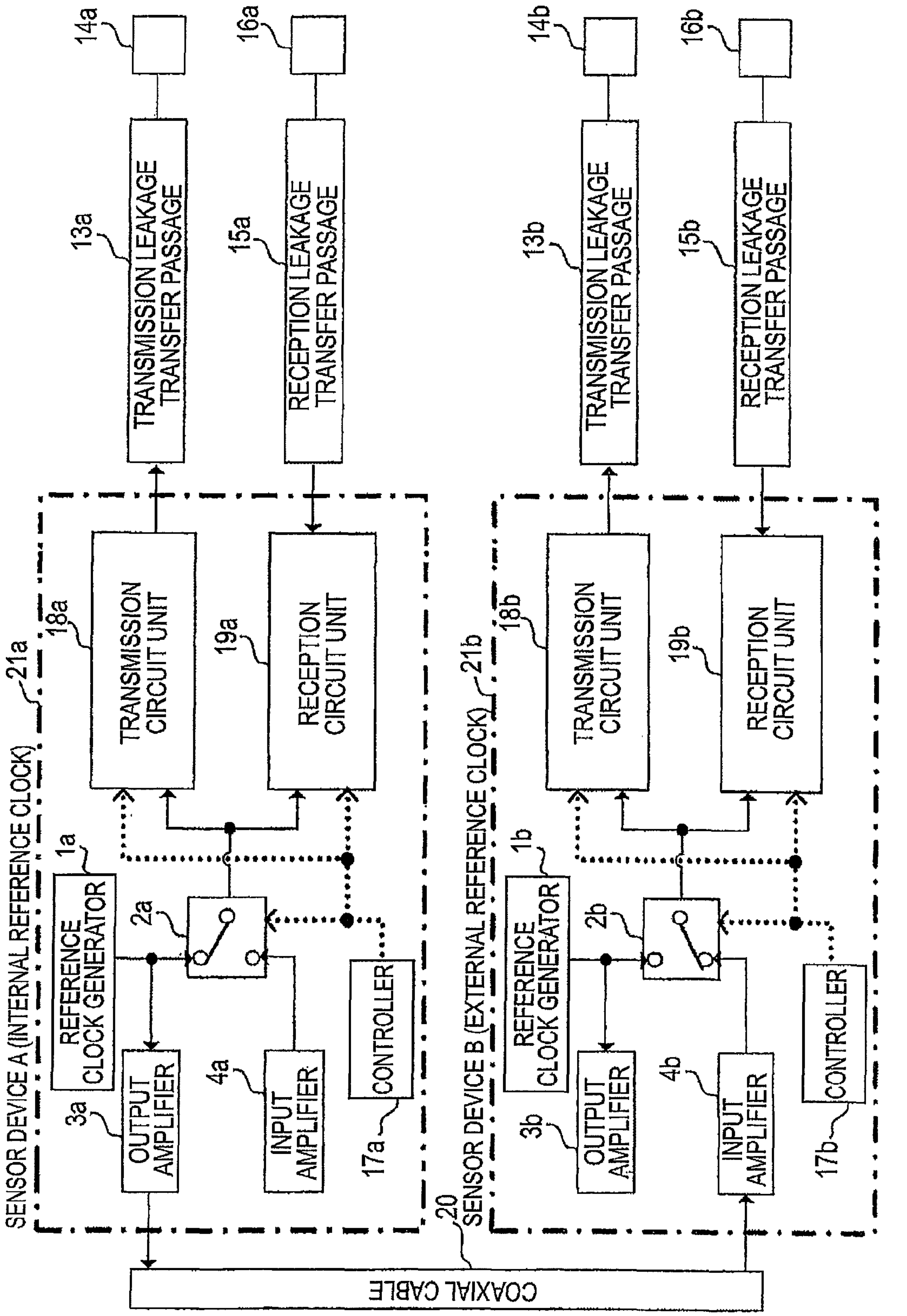
FIG. 2 is a system configuration diagram illustrating an example of the intrusion detection system according to the first embodiment of the present invention.
Figure 3:
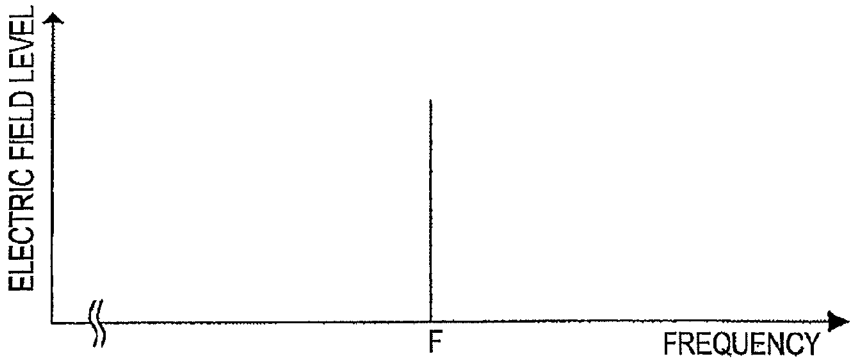
FIG. 3 is a diagram illustrating an example of an output waveform of a transmission voltage-controlled oscillator in FIG. 1 according to the first embodiment of the present invention.
Figure 4:
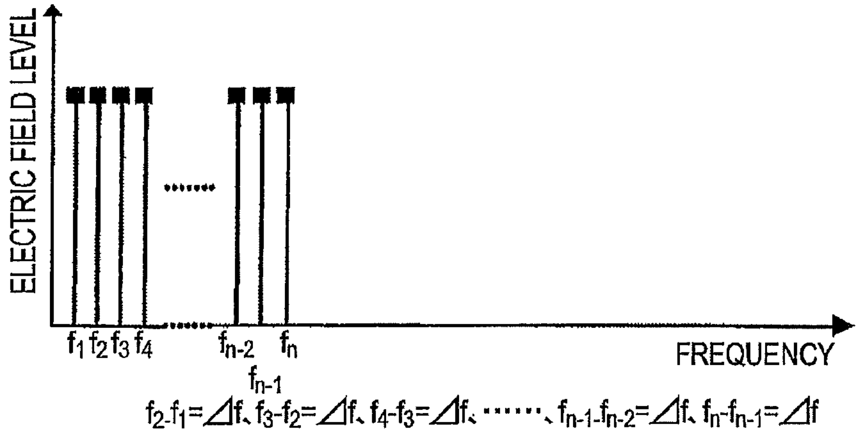
FIG. 4 is a diagram illustrating an example of an output waveform of a transmission spectrum diffusion signal generator in FIG. 1 according to the first embodiment of the present invention.
Figure 5:
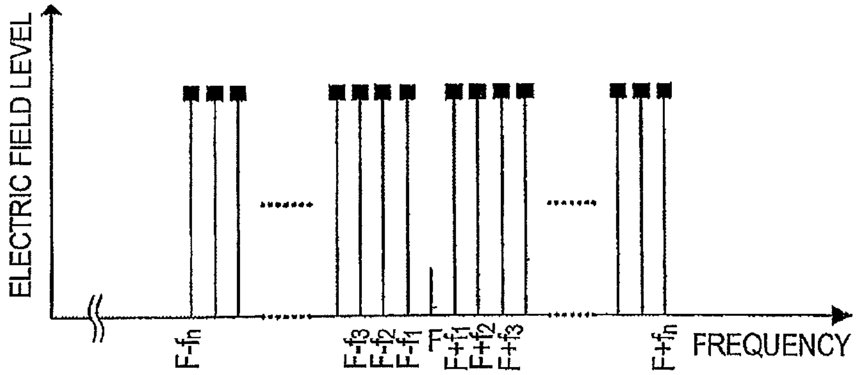
FIG. 5 is a diagram illustrating an example of an output waveform of a transmission mixer in FIG. 1 according to the first embodiment of the present invention.
Figure 6:
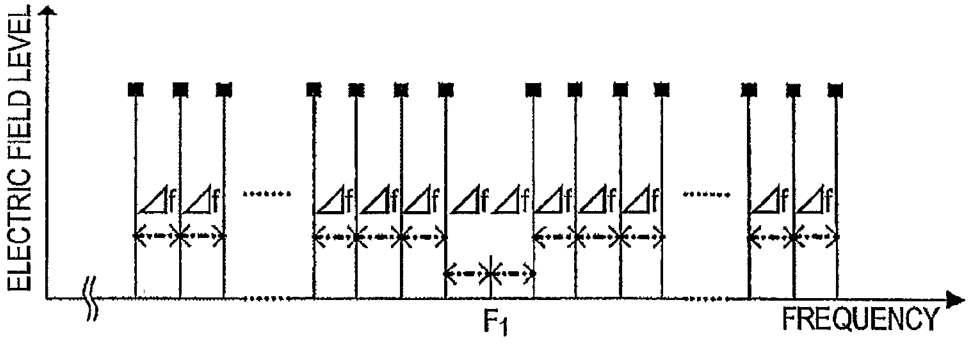
FIG. 6 is a diagram illustrating an example of an output waveform of a transmission leakage transfer passage in FIG. 2 according to the first embodiment of the present invention.
Figure 7:
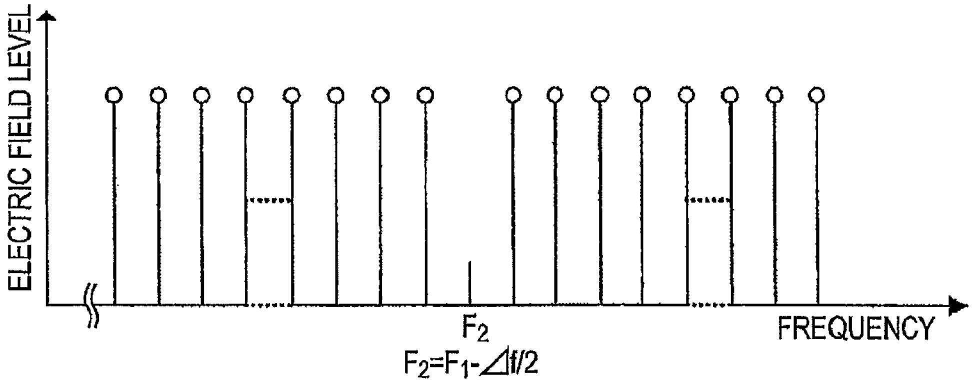
FIG. 7 is a diagram illustrating an example of an output waveform of a transmission leakage transfer passage in FIG. 2 according to the first embodiment of the present invention.
Figure 8:
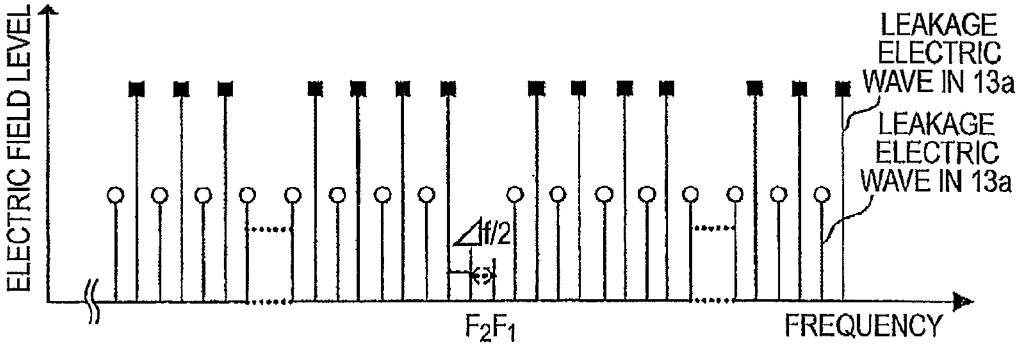
FIG. 8 is a diagram illustrating an example of an input waveform of a reception leakage transfer passage in FIG. 2 according to the first embodiment of the present invention.
Figure 9:
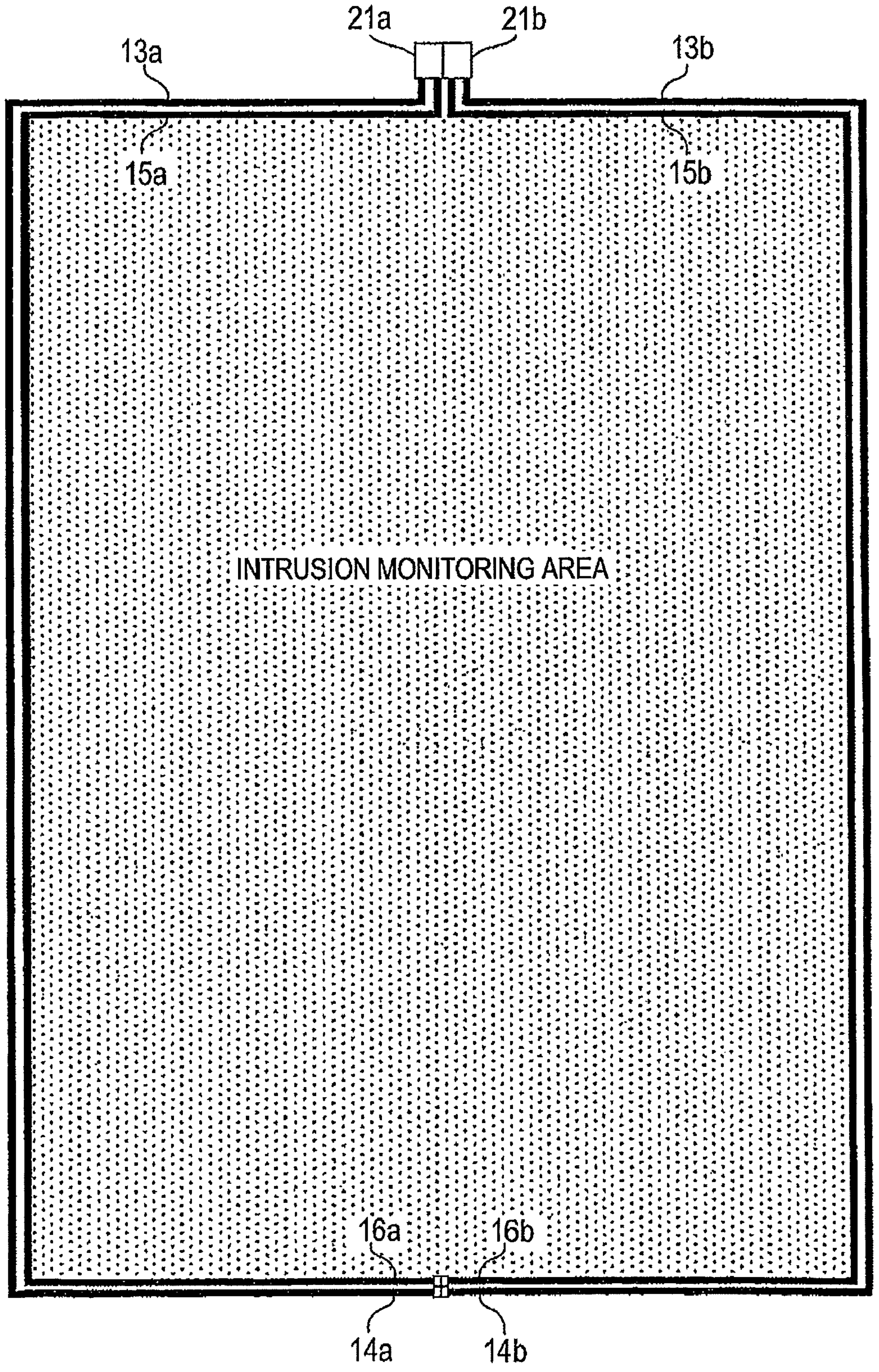
FIG. 9 is a diagram illustrating the effects of the first embodiment of the present invention.

The first embodiment of the present invention will be described with reference to FIGS. 1 to 9; FIG. 1 is a block diagram illustrating an internal configuration of an example of a sensor device used in an intrusion detection system; FIG. 2 is a system configuration diagram illustrating an example of the intrusion detection system; FIG. 3 is a diagram illustrating an example of an output waveform of a transmission voltage-controlled oscillator 8 in FIG. 1; FIG. 4 is a diagram illustrating an example of an output waveform of a transmission spectrum diffusion signal generator 7 in FIG. 1; FIG. 5 is a diagram illustrating an example of an output waveform of a transmission mixer 8 in FIG. 1; FIG. 6 is a diagram illustrating an example of an output waveform of a transmission leakage transfer passage 13*a* in FIG. 2; FIG. 7 is a diagram illustrating an example of an output waveform of a transmission leakage transfer passage 13*b* in FIG. 2; FIG. 8 is a diagram illustrating an example of an input waveform of a reception leakage transfer passage 15*a* in FIG. 2; and FIG. 9 is a diagram illustrating the effects of the first embodiment of the present invention.

In FIG. 1, a sensor device 21 used in the intrusion detection system includes a reference clock generator 1, an internal/external switchover switch 2, an output amplifier 3, an input amplifier 4, a controller 17, a transmission circuit unit 18, and a reception circuit unit 19.

A modulation wave of a transmission spectrum diffusion signal is transmitted from the transmission circuit unit 18 to a transmission leakage transfer passage 13. A modulation wave of a spectrum diffusion signal which has leaked from the transmission leakage transfer passage 13 to a reception leakage transfer passage 15 is received by the reception circuit unit 19. The reception circuit unit 19 determines the presence of an intrusion of an object which should be detected and detects the intrusion of the object which should be detected.

A well-known transmission terminator 14 is provided at a terminating end of the transmission leakage transfer passage 13, and a well-known transmission terminator 16 is provided at a terminating end of the reception leakage transfer passage 15.

The transmission circuit unit 18 includes a transmission phase synchronization circuit 5, a transmission voltage-controlled oscillator 6, a transmission spectrum diffusion signal generator 7, and a transmission mixer 8.

The reception circuit unit 19 includes a reception phase synchronization circuit 9, a reception voltage-controlled oscillator 10, a reception mixer 11, and a detection processor 12.

The output amplifier 3 is an amplifier for outputting a reference clock signal of the reference clock generator 1 to an external device. The input amplifier 4 is an amplifier for amplifying a reference clock signal supplied from an external device. The internal/external switchover switch 2 is a switch for selectively switching between an internal reference clock signal generated by the internal reference clock generator 1 and an external reference clock signal output from the input amplifier 4. The internal/external switchover switch 2 supplies the selected reference clock signal to the transmission phase synchronization circuit 5, the transmission spectrum diffusion signal generator 7, the reception phase synchronization circuit 9, and the detection processor 12.

The transmission phase synchronization circuit 5 and the transmission voltage-controlled oscillator 6 generate a transmission local frequency F instructed by the controller 17 and perform modulation of the transmission mixer 8 and the transmission spectrum diffusion signal generator 7.

The transmission leakage transfer passage 13 is a leakage cable, for example, for radiating a modulation wave output from the transmission mixer 8.

The reception leakage transfer passage 15 is a leakage cable, for example, for receiving a leakage electric wave from the transmission leakage transfer passage 13.

The reception phase synchronization circuit 9 and the reception voltage-controlled oscillator 10 generates a reception local frequency instructed by the controller 17 and converts a reception electric wave of the reception mixer 11 and the reception leakage transfer passage 16 into an intermediate frequency.

The detection processor 12 demodulates the intermediate frequency from the reception mixer 11 so as to detect a fluctuation in an electric wave caused by an object intruding between the transmission leakage transfer passage 13 and the reception leakage transfer passage 15.

The controller 17 simultaneously performs switching of the internal/external switchover switch 2 and changing of the frequency of the transmission phase synchronization circuit 5 and the reception phase synchronization circuit 9.

FIG. 2 illustrates an example of a system configuration in which two sets of the intrusion detection system shown in FIG. 1 are used to detect an intrusion of an object which should be detected into an intrusion monitoring area as shown in FIG. 9, for example. The sensor device 21 in FIG. 1 is used for any of sensor device A 21*a* and sensor device B 21*b* in FIG. 2. In other words, the sensor device A 21*a* and the sensor device B 21*b* have the same internal configuration and function. To put it another way, sensor devices having the same structure and the same function are used for the sensor device A 21*a* and the sensor device B 21*b*.

Therefore, although the respective internal configurations of the transmission circuit units 18*a* and 18*b* and the reception circuit units 19*a* and 19*b* are not illustrated in FIG. 2, the transmission circuit unit 18 in FIG. 1 is used for the transmission circuit units 18*a* and 18*b*, and the reception circuit unit 19 in FIG. 1 is used for the reception circuit units 19*a* and 19*b*.

In FIG. 2, the sensor device A (internal reference clock) 21*a* that uses the reference clock signal generated by an internal reference clock generator 1*a* has its internal/external switchover switch 2*a* which is switched to the internal reference clock generator 1*a*.

The sensor device B (external reference clock) 21*b* that uses the reference clock signal generated by the reference clock generator 1*a* of an external device has its internal/external switchover switch 2*b* which is switched to the reference clock generator 1*a* of an external device (the sensor device A 21*a*).

A non-leaking coaxial cable 20 is a coaxial cable for connecting an output amplifier 3*a* of the sensor device A (internal reference clock) 21*a* and an input amplifier 4*b* of the sensor device B (external reference clock) 21*b* together in order to supply the reference clock signal of the reference clock generator 1*a* output from the output amplifier 3*a* of the sensor device A (internal reference clock) 21*a* to the sensor device B (external reference clock) 21*b*.

Next, an operation of the present embodiment will be described with reference to FIGS. 1 to 8.

The transmission phase synchronization circuit 5 controls the transmission voltage-controlled oscillator 6 so as to generate a frequency F instructed by the controller 17. By this control, the transmission voltage-controlled oscillator 6 outputs a local frequency F shown in FIG. 3 to the transmission mixer 8.

In synchronization with a reference clock signal on the basis of the reference clock signal generated by the reference clock generator 1, the transmission spectrum diffusion signal generator 7 outputs a spectrum diffusion signal $f_1, f_2, \ldots,$ and $f_n$ having intervals of Δf shown in FIG. 4 to the transmission mixer 8.

The transmission mixer 8 outputs a modulation wave that carries the spectrum diffusion signal on a transmission local frequency F as shown in FIG. 5 to the transmission leakage transfer passage 13.

The modulation wave is radiated by the transmission leakage transfer passage 13. The reception leakage transfer passage 15 receives the modulation wave which has been changed by an object having intruded between the transmission leakage transfer passage 13 and the reception leakage transfer passage 15 and outputs the changed modulation wave to the reception mixer 11.

The reception phase synchronization circuit 9, the reception voltage-controlled oscillator 10, and the reception mixer 11 decrease the received modulation wave to a frequency necessary for the detection processor 19 to process the received modulation wave.

Upon receiving the output of the reception mixer 11, the detection processor 19 detects a change in the modulation wave caused by the intruding object.

The sensor device A (internal reference clock) 21*a* sets the internal/external switchover switch 2*a* to be switched to the side of the internal reference clock generator 1*a* by the control of the controller 17*a*. At the same time, the sensor device A (internal reference clock) 21*a* sets a local frequency to the transmission phase synchronization circuit 5 of the transmission circuit unit 18*a* and the reception phase synchronization circuit 9 of the reception circuit unit 19*a* so as to be able to transmit and receive the frequency $F_1$.

Moreover, the modulation wave output from the transmission circuit unit 18*a* is radiated from the transmission leakage transfer passage 13*a* as an electric wave and received by the reception leakage transfer passage 15*a*. FIG. 6 illustrates the waveform of the modulation wave from the transmission leakage transfer passage 13*a*, in which the local frequency $F_1$ represents the center frequency of the modulation wave, and Δf represents the intervals of the spectrum diffusion signal.

The sensor device B (external reference clock) 21*b* sets the internal/external switchover switch 2*b* to be switched to the side of the input amplifier 4*b* of an external device by the control of the controller 17*b*. At the same time, the sensor device B (external reference clock) 21*b* sets a frequency $F_2$ to the transmission circuit unit 18*b* and the reception circuit unit 19*b* so as to be able to transmit and receive a frequency ($F_1$−n×Δf/2) (n: a multiple of an odd number).

Moreover, the modulation wave transmitted from the transmission circuit unit 18*b* is radiated from the transmission leakage transfer passage 13*b* as an electric wave and received by the reception leakage transfer passage 15*b*. FIG. 7 illustrates the waveform of the modulation wave from the transmission leakage transfer passage 13*b*.

The non-leaking coaxial cable 20 connects the output amplifier 3*a* and the input amplifier 4*b* together, supplies the reference clock signal of the reference clock generator 1*a* output from the output amplifier 3*a* to the input amplifier 4*b* so as to make the reference clock signals of the first sensor device A (internal reference clock) 21*a* and the second sensor device B (external reference clock) 21*b* identical to each other. That is to say, the reference clock signal serving as the reference of the transmission spectrum diffusion signal in the first sensor device A (internal reference clock) 21*a* and the reference clock signal serving as the reference of the transmission spectrum diffusion signal in the second sensor device B (external reference clock) 21*b* are supplied from the same reference clock generator 1*a*.

In the present first embodiment, the first reception leakage transfer passage 15*a* which is connected to the first sensor device A (internal reference clock) 21*a* and arranged in parallel to the first transmission leakage transfer passage 13*a* is installed at a position close to the transmission leakage transfer passage 13*b* which is connected to the second sensor device B (external reference clock) 21*b* and arranged in parallel to the second reception leakage transfer passage 15*b*. In this case, the first reception leakage transfer passage 15*a* will receive both the leakage electric wave of the transmission leakage transfer passage 13*a* and the leakage electric wave of the transmission leakage transfer passage 13*b* as shown in FIG. 8. However, the reference clock signal used by the first sensor device A (internal reference clock) 21*a* and the reference clock signal used by the second sensor device B (external reference clock) 21*b* are supplied from the same reference clock generator 1*a* so as to make both clock signals identical to each other. In addition, the spectrum diffusion signal generated by the first sensor device A (internal reference clock) 21*a* and the spectrum diffusion signal generated by the second sensor device B (external reference clock) 21*b* are shifted in frequency, for example, by ½ of a signal interval Δf of the spectrum diffusion signal. Therefore, the spectrum diffusion signal in the leakage electric wave of the transmission leakage transfer passage 13*a* received by the first reception leakage transfer passage 15*a* will not overlap with the spectrum diffusion signal in the leakage electric wave of the transmission leakage transfer passage 13*b* received by the first reception leakage transfer passage 15*a*. Thus, it is possible to prevent an interference between both spectrum diffusion signals.

Figure 16:
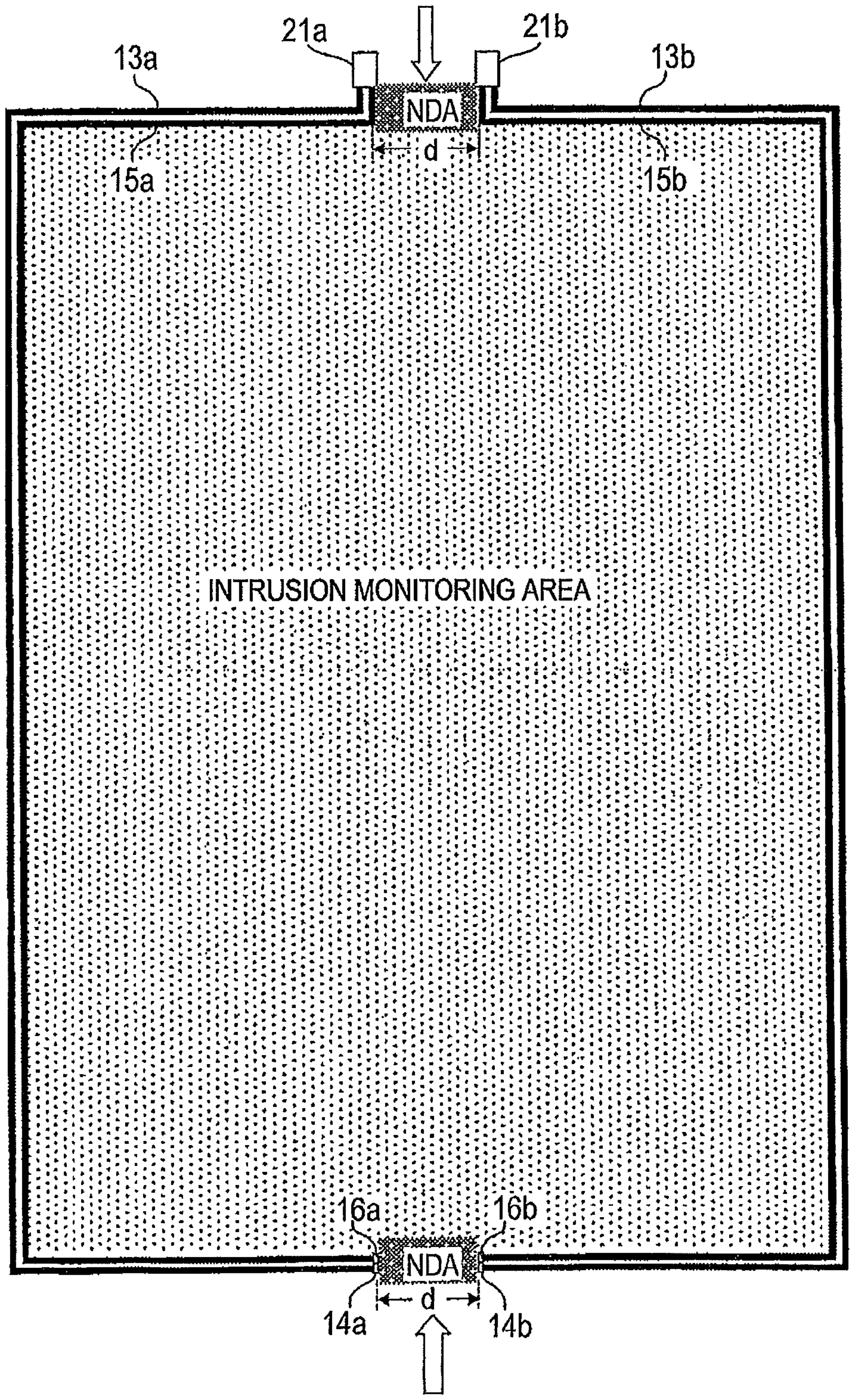
FIG. 16 is a diagram provided to describe a problem when using an intruder detection system according to the related art in which an intrusion of a person or other objects which should be monitored into an intrusion monitoring area or a boundary thereof is monitored using plural sets of intruder detection systems.

When an intrusion of an object which should be detected is detected by installing plural sets of intrusion detection systems which uses the sensor device according to the related art, the reference clock signals of the sensor devices in the respective systems are independent from each other. Therefore, both spectrum diffusion signals may sometimes overlap with each other due to a change in the reference clock signal (for example, due to a change in temperature, voltage, or the like), thus causing an interference between both spectrum diffusion signals. Accordingly, as shown in FIG. 16, in order to prevent the interference, it is necessary to provide a separation distance of d between the respective starting ends of the first transmission leakage transfer passage 13*a* and the first reception leakage transfer passage 15*a* connected to the first sensor device 21*a* and the respective starting ends of the second transmission leakage transfer passage 13*b* and the second reception leakage transfer passage 15*b* connected to the second sensor device 21*b*. Thus, a non-detectable area NDA is formed between both starting ends. Similarly, it is necessary to provide a separation distance of d between the respective terminating ends of the first transmission leakage transfer passage 13*a* and the first reception leakage transfer passage 15*a* connected to the first sensor device 21*a* and the respective terminating ends of the second transmission leakage transfer passage 13*b* and the second reception leakage transfer passage 15*b* connected to the second sensor device 21*b*. Thus, a non-detectable area NDA is formed between both terminating ends. As a result, there is a problem in that it is difficult to prevent an intrusion of an object which should be monitored into an intrusion monitoring area from the non-detectable area NDA between both starting ends and the non-detectable area NDA between both terminating ends as indicated by empty arrows.

To the contrary, in the present first embodiment, since the interference such as described above will not occur, unlike the example in FIG. 9, it is not necessary to provide a separation between the respective starting ends of the first transmission leakage transfer passage 13*a* and the first reception leakage transfer passage 15*a* connected to the first sensor device 21*a* and the respective starting ends of the second transmission leakage transfer passage 13*b* and the second reception leakage transfer passage 15*b* connected to the second sensor device 21*b*. Thus, the non-detectable area NDA such as in FIG. 16 is not formed between both starting ends. Similarly, it is not necessary to provide a separation between the respective terminating ends of the first transmission leakage transfer passage 13*a* and the first reception leakage transfer passage 15*a* connected to the first sensor device 21*a* and the respective terminating ends of the second transmission leakage transfer passage 13*b* and the second reception leakage transfer passage 15*b* connected to the second sensor device 21*b*. Thus, the non-detectable area NDA such as in FIG. 16 is not formed between both terminating ends.

Therefore, according to the present first embodiment, when an intrusion of a person or other objects which should be monitored into an intrusion monitoring area or a boundary thereof is monitored using plural sets of intruder detection systems, and even when at least a part of a transmission leakage transfer passage of one intruder detection system is installed at a position close to at least a part of a transmission leakage transfer passage of another intruder detection system, it is possible to prevent a detection error of the sensor devices.

As described above, the present first embodiment provides an intrusion detection system including a first sensor device and a second sensor device. The first sensor device includes a first transmission circuit unit that transmits a modulation wave of a first transmission spectrum diffusion signal to a first transmission leakage transfer passage, and a first reception circuit unit that receives the modulation wave of the first transmission spectrum diffusion signal having leaked from the first transmission leakage transfer passage to a first reception leakage transfer passage so as to detect an intrusion of an object to be detected into an area subject to monitoring for an intrusion of an object to be detected on the basis of the received modulation wave. The second sensor device includes a second transmission circuit unit that transmits a modulation wave of a second transmission spectrum diffusion signal to a second transmission leakage transfer passage, and a second reception circuit unit that receives the modulation wave of the second transmission spectrum diffusion signal having leaked from the second transmission leakage transfer passage to a second reception leakage transfer passage so as to detect an intrusion of an object to be detected into an area subject to monitoring for an intrusion of an object to be detected on the basis of the received modulation wave. A signal interval of the first transmission spectrum diffusion signal is the same as a signal interval of the second transmission spectrum diffusion signal, and the first transmission spectrum diffusion signal and the second transmission spectrum diffusion signal are shifted in frequency so that the first transmission spectrum diffusion signal does not overlap with the second transmission spectrum diffusion signal.

The intrusion detection system has a configuration in which the first transmission spectrum diffusion signal and the second transmission spectrum diffusion signal are generated on the basis of the same reference clock signal.

The intrusion detection system has a configuration in which the reference clock signal is a clock signal which is output from one reference clock generator.

The intrusion detection system has a configuration in which the first transmission spectrum diffusion signal and the second transmission spectrum diffusion signal are shifted in frequency by a frequency smaller than a signal interval Δf of the transmission spectrum diffusion signal.

The intrusion detection system has a configuration in which the reference clock generator is provided to the first sensor device, and an output of the reference clock generator is supplied to the second sensor device as a reference clock signal via a non-leaking coaxial cable.

The present first embodiment also provides a sensor device that transmits a modulation wave of a transmission spectrum diffusion signal to a transmission leakage transfer passage, receives the modulation wave having leaked from the transmission leakage transfer passage to a reception leakage transfer passage, and detects an intrusion of an object to be detected into an area subject to monitoring for an intrusion of an object to be detected on the basis of the received modulation wave. The sensor device includes: a reference clock generator that generates a reference clock signal; an output amplifier that is connected to an output terminal of the reference clock generator so as to output the reference clock signal generated by the reference clock generator to an external device; an input amplifier that inputs a reference clock signal from an external device; and a switchover switch that selectively supplies either one of the reference clock signal generated by the reference clock generator and a reference clock signal from the external device input by the input amplifier to a transmission spectrum diffusion signal generator. The transmission spectrum diffusion signal generator generates the transmission spectrum diffusion signal on the basis of a reference clock signal selectively supplied via the switchover switch.

The present first embodiment also provides an electric wave-based intruder detection device having an interference suppression function, including: an output amplifier for outputting an internal reference clock signal to an external device; an input amplifier for inputting a reference clock signal from an external device; a switch for selecting between the internal reference clock signal and the reference clock signal of the external device from the input amplifier; a controller that controls the switch; and a coaxial cable for supplying the reference clock signal between the present devices.

The present first embodiment also provides an electric wave-based intruder detection device having an interference suppression function, which is an interference wave suppression device in an electric wave-based intrusion detection system. The intruder detection device includes: a phase synchronization circuit and a voltage-controlled oscillator for changing a transmission local frequency when two or more intruder detection devices are installed; a phase synchronization circuit and a voltage-controlled oscillator for changing a reception local frequency; and a controller for controlling the local frequencies so that spectrum diffusion signals between the devices do not overlap simultaneously with controlling a switch for selecting reference clock signals of internal and external devices.

Second Embodiment

Figure 10:
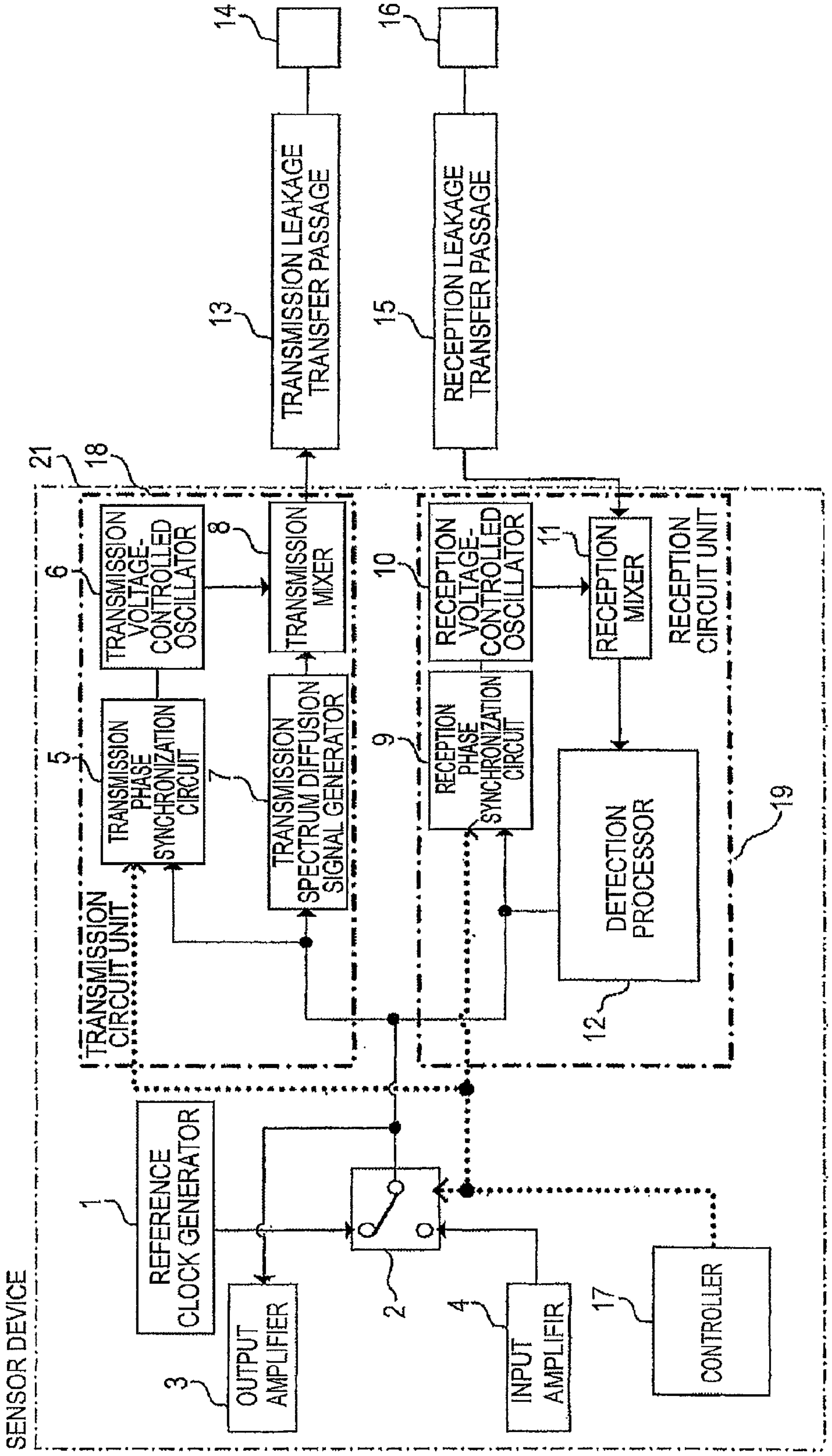
FIG. 10 is a block diagram illustrating an internal configuration of another example of a sensor device used in an intrusion detection system according to the second embodiment of the present invention.
Figure 11:
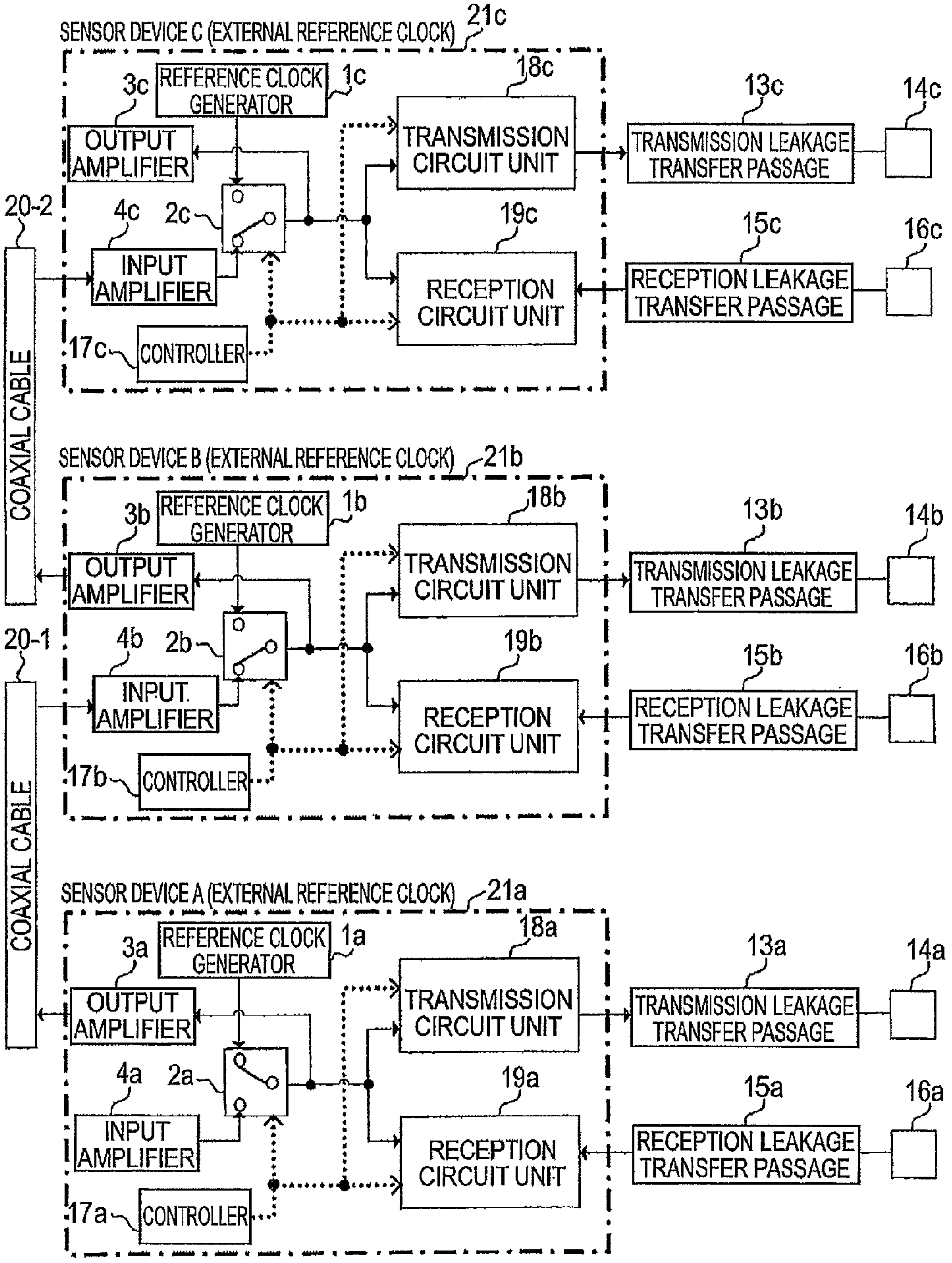
FIG. 11 is a system configuration diagram illustrating another example of the intrusion detection system according to the second embodiment of the present invention.
Figure 12:
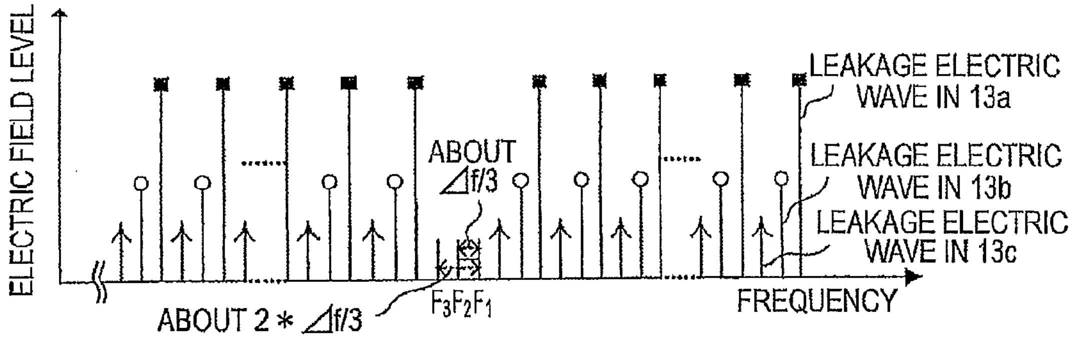
FIG. 12 is a diagram illustrating an example of the waveform of a leakage electric wave according to the second embodiment of the present invention.

The second embodiment will be described with reference to FIGS. 10 to 12. FIG. 10 is a block diagram illustrating an internal configuration of another example of a sensor device used in an intrusion detection system; FIG. 11 is a system configuration diagram illustrating another example of the intrusion detection system; and FIG. 12 is a diagram illustrating an example of the waveform of a leakage electric wave.

The sensor device 21 of the example shown in FIG. 10 has a configuration in which an output amplifier 3 is connected to an output side of the internal/external switchover switch 2, and other configurations are the same as those shown in FIG. 1 according to the first embodiment.

FIG. 11 is a system configuration diagram when three sensor devices in FIG. 10 are connected together. As shown in FIG. 11, the first sensor device A (internal reference clock) 21*a* sets the internal/external switchover switch 2*a* to be switched to the side of the internal reference clock generator 1*a* by the control of the controller 17*a*. At the same time, the first sensor device A (internal reference clock) 21*a* sets a frequency to the transmission circuit unit 18*a* and the reception circuit unit 19*a* so as to be able to transmit and receive the frequency $F_1$.

A non-leaking coaxial cable 20-1 connects the output amplifier 3*a* and the input amplifier 4*b* together, supplies the reference clock signal of the reference clock generator 1*a* output from the output amplifier 3*a* to the input amplifier 4*b* so as to make the reference clock signals of the first sensor device A (internal reference clock) 21*a* and the second sensor device B (external reference clock) 21*b* identical to each other.

The second sensor device B (external reference clock) 21*b* sets the internal/external switchover switch 2*b* to be switched to the side of an input amplifier 4*b* of an external device by the control of the controller 17*b*. At the same time, as shown in FIG. 12, the second sensor device B (external reference clock) 21*b* sets a frequency to the transmission circuit unit 18*b* and the reception circuit unit 19*b* so as to be able to transmit and receive a frequency of about $(F_1-(3n+1)\times\Delta f/3)$ (n: a multiple of an integer) so that the spectrum diffusion signal does not overlap with that of the first sensor device A (internal reference clock) 21*a*.

A non-leaking coaxial cable 20-2 connects the output amplifier 3*b* and the input amplifier 4*c* together, supplies the reference clock signal of the reference clock generator 1*a* output from the output amplifier 3*b* to the input amplifier 4*c* so as to make the reference clock signals of the first sensor device A (internal reference clock) 21*a* and the second sensor device B (external reference clock) 21*b*, a third sensor device C (external reference clock) 21*c* identical to each other.

The third sensor device C (external reference clock) 21*c* sets an internal/external switchover switch 2*c* to be switched to the side of an input amplifier 4*c* of an external device by the control of a controller 17*c*. At the same time, as shown in FIG. 12, the third sensor device C (external reference clock) 21*c* sets a frequency to a transmission circuit unit 18*c* and a reception circuit unit 19*c* so as to be able to transmit and receive a frequency of about $(F_1-(3n+2)\times\Delta f/3)$ (n: a multiple of an integer) so that the spectrum diffusion signal does not overlap with that of the first sensor device A (internal reference clock) 21*a* and the second sensor device B (external reference clock) 21*b*.

The first embodiment described above has been described for a case where two sensor devices 21*a* and 21*b* are connected together as shown in FIG. 2. In the second embodiment, as shown in FIG. 12, three sensor devices or more are connected together so as to share an output clock signal of one clock signal generator 1*a*. Therefore, by setting the local frequency so that the spectrum diffusion signals do not overlap with each other, it is possible to connect three sensor devices or more together.

As described above, the present second embodiment provides a sensor device that transmits a modulation wave of a transmission spectrum diffusion signal to a transmission leakage transfer passage, receives the modulation wave having leaked from the transmission leakage transfer passage to a reception leakage transfer passage, and detects an intrusion of an object to be detected into an area subject to monitoring for an intrusion of an object to be detected on the basis of the received modulation wave. The sensor device includes: a reference clock generator that generates a reference clock signal; an input amplifier that inputs a reference clock signal from an external device; a switchover switch that selectively supplies either one of the reference clock signal generated by the reference clock generator and the reference clock signal from the external device input by the input amplifier to a transmission spectrum diffusion signal generator; and an output amplifier that outputs the reference clock signal generated by the reference clock generator to an external device when the reference clock signal generated by the reference clock generator is supplied to the transmission spectrum diffusion signal generator by the switchover switch. The transmission spectrum diffusion signal generator generates the transmission spectrum diffusion signal on the basis of a reference clock signal selectively supplied via the switchover switch.

The present second embodiment also provides an electric wave-based intruder detection device having an interference suppression function, which is an interference wave suppression device in an electric wave-based intrusion detection system, and which is capable of outputting a reference clock signal of an external device to an external device with a facility having an output amplifier for outputting a reference clock signal to an external device to an output side of a switch that selects between an internal reference clock signal and a reference clock signal of an external device.

Third Embodiment

Figure 13:
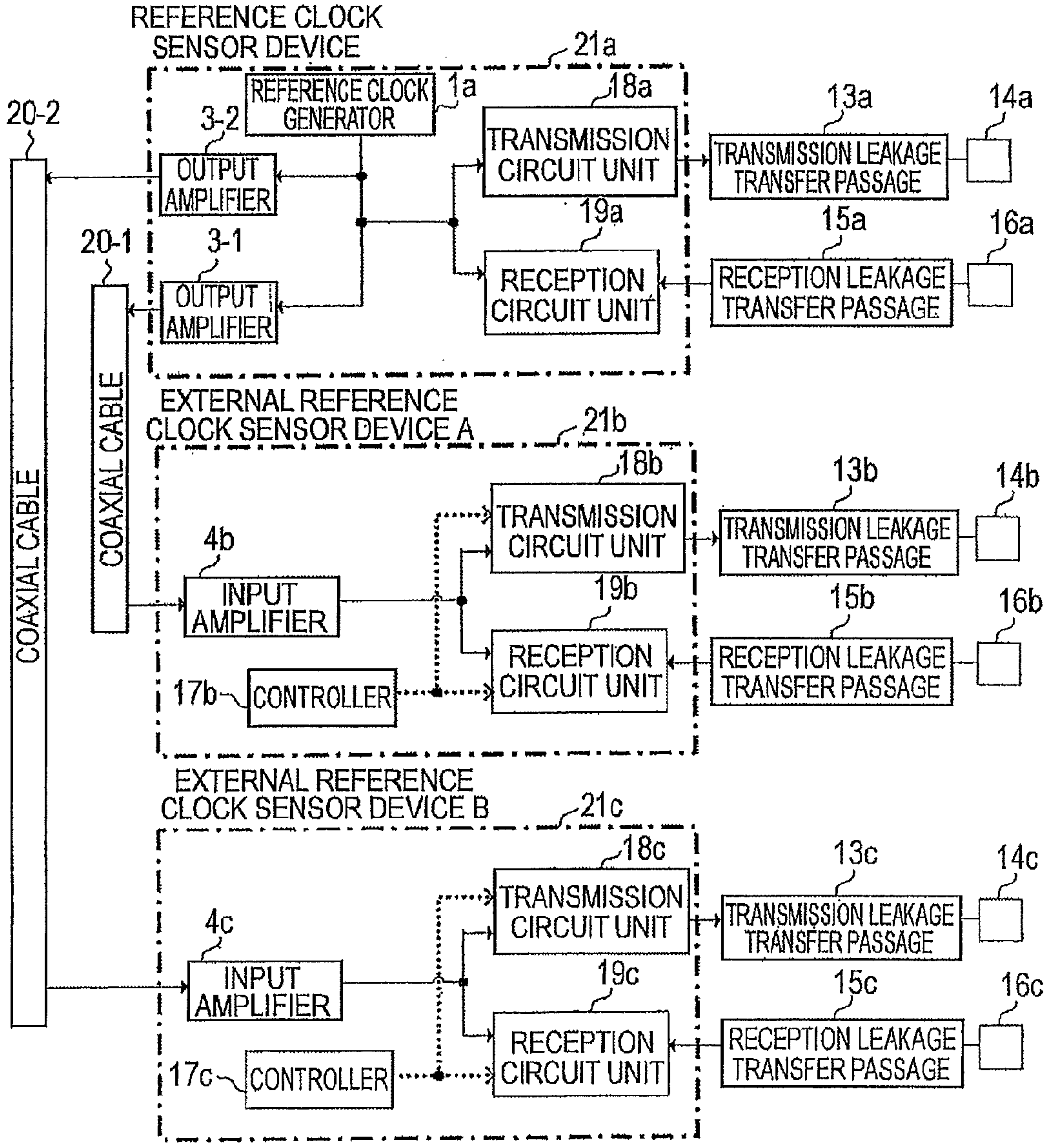
FIG. 13 is a system configuration diagram illustrating a further example of an intrusion detection system according to the third embodiment of the present invention.

The third embodiment will be described with reference to FIG. 13 which illustrates a further example of an intrusion detection system.

The first and second embodiments described above have been described for a case where the respective sensor devices are caused to share a reference clock signal by the output amplifier, the input amplifier, and the internal/external switchover switch. In the third embodiment, as shown in FIG. 13, the first sensor device 21*a* of the reference clock generator 1*a* is not provided with the input amplifier 4*a* and the internal/external switchover switch 2*a* according to the first and second embodiments described above. Instead, the first sensor device 21*a* is provided with output amplifiers 3-1 and 3-2 which each have an input terminal thereof connected to the output terminal of the reference clock generator 1*a*. Moreover, the transmission circuit unit 18*a* and the reception circuit unit 19*a* are fixed to a frequency so as to be able to transmit and receive the local frequency $F_1$ and have a function of only outputting the reference clock signal.

The second sensor device (external reference clock) 21*b* is not provided with the reference clock generator 1*b*, the output amplifier 3*b*, and the internal/external switchover switch 2*b* according to the first and second embodiments described above. The reference clock signal is supplied through the coaxial cable 20-1 from the reference clock generator 1*a* of the first sensor device 21*a*. The transmission circuit unit 18*b* and the reception circuit unit 19*b* are set to the local frequency by the controller 17*b* so that the spectrum diffusion signals do not overlap with each other.

The third sensor device 21*c* has the same configuration as the second sensor device 21*b*. Specifically, the local frequency of the transmission circuit unit 18*c* and the reception circuit unit 19*c* are set by the controller 17*c* so as not to overlap with the respective spectrum diffusion signals of the first sensor device 21*a* and the second sensor device 21*b*.

By dividing the sensor devices into a sensor device having the reference clock generator 1*a* such as the first sensor device 21*a* and sensor devices such as the second and third sensor devices 2*b* and 2*c* which are not provided with a reference clock generator and are capable of sharing an output clock signal of a reference clock generator of another external sensor device (the first sensor device 21*a*), it is possible to obtain a device having a simple structure.

As described above, the present third embodiment provides a sensor device that transmits a modulation wave of a transmission spectrum diffusion signal to a transmission leakage transfer passage, receives the modulation wave having leaked from the transmission leakage transfer passage to a reception leakage transfer passage, and detects an intrusion of an object to be detected into an area subject to monitoring for an intrusion of an object to be detected on the basis of the received modulation wave. The sensor device includes a reference clock generator that generates a reference clock signal; and plural sets of output amplifiers that is connected to an output terminal of the reference clock generator so as to output the reference clock signal generated by the reference clock generator to an external device. The transmission spectrum diffusion signal generator generates the transmission spectrum diffusion signal on the basis of the reference clock signal generated by the reference clock generator.

The present third embodiment also provides an electric wave-based intruder detection device having an interference suppression function, including: a device having two or more output amplifiers for outputting an internal reference clock signal to an external device; a device having an input amplifier for inputting a reference clock signal from an external device; and a coaxial cable for supplying a reference clock signal between the two devices.

Fourth Embodiment

Figure 14:
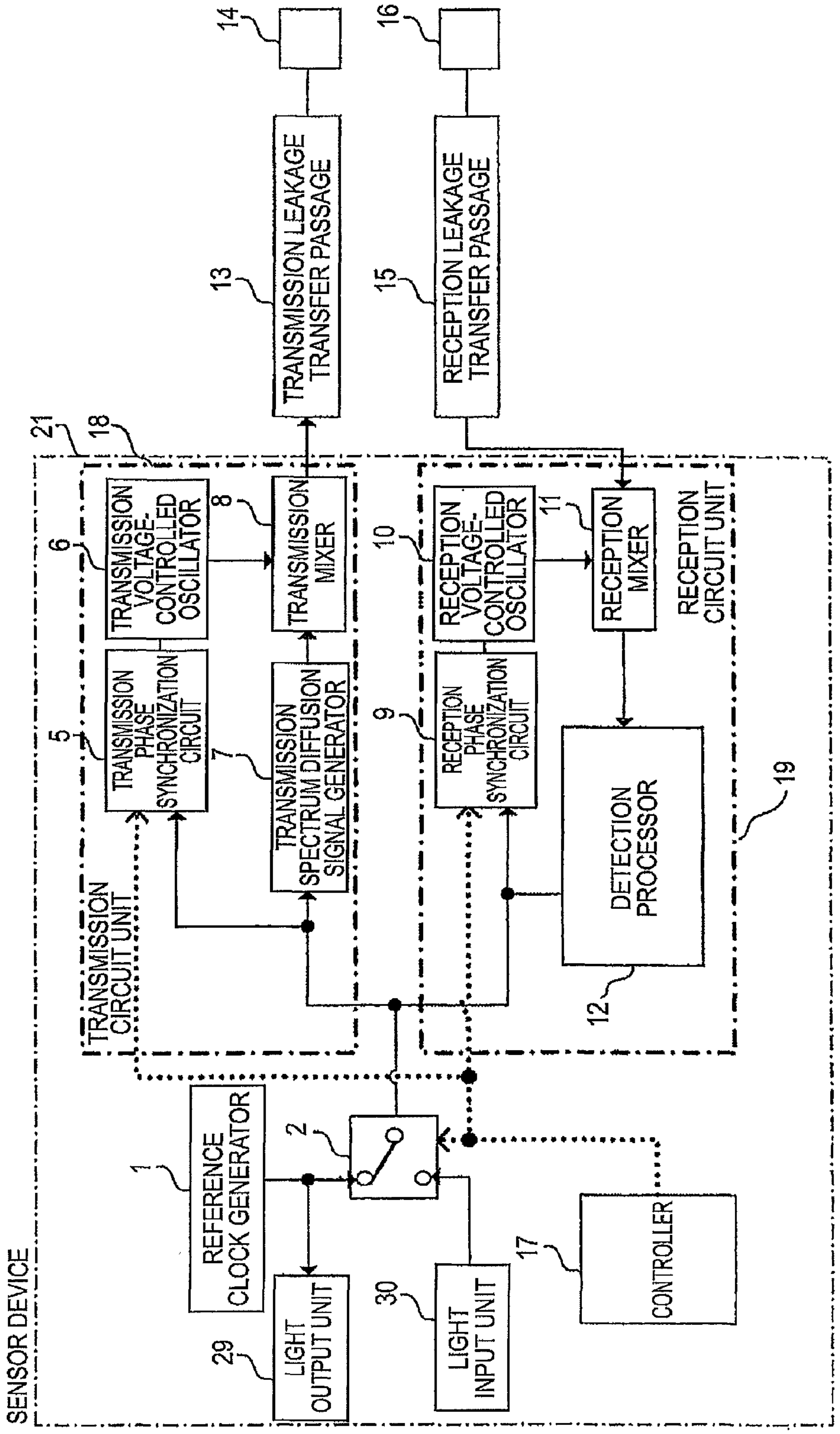
FIG. 14 is a block diagram illustrating an internal configuration of another example of a sensor device used in an intrusion detection system according to the fourth embodiment of the present invention.

The fourth embodiment will be described with reference to FIG. 14 which illustrates an internal configuration of another example of a sensor device used in an intrusion detection system.

The first to third embodiments described above have been described for a case where one sensor device outputs the reference clock signal generated by the reference clock generator 1, 1*a* from the output amplifier 3, 3*a*, 3-2, and the other device inputs the reference clock signal, which is generated by the reference clock generator 1, 1*a* of the one sensor device and supplied from an external device, to the input amplifier 4. In the fourth embodiment, as shown in FIG. 14, a light output unit 29 is provided so as to convert the reference clock signal of the reference clock generator 1 into an optical signal and output the optical signal. Moreover, a light input unit 30 is provided so as to convert the reference clock signal, which has been converted into the optical signal and supplied from the reference clock generator 1 of another external sensor device having the same structure, into an electrical signal. The respective sensor devices are connected by an optical cable. Thus, the reference clock signal of the same reference clock generator 1 can be shared by plural sets of sensor devices. Furthermore, even when the respective sensor devices are distant from each other, it is possible to supply the reference clock signal from one sensor device to another sensor device.

As described above, the present fourth embodiment provides an intrusion detection system in which a clock signal which is obtained by a light output unit converting an output of the reference clock generator into an optical signal is transmitted to a light input unit and converted into an electrical signal, and the transmission spectrum diffusion signal is generated on the basis of a clock signal which is obtained by the light input unit converting the optical signal into the electrical signal.

The present fourth embodiment also provides a sensor device that transmits a modulation wave of a transmission spectrum diffusion signal to a transmission leakage transfer passage, receives the modulation wave having leaked from the transmission leakage transfer passage to a reception leakage transfer passage, and detects an intrusion of an object to be detected into an area subject to monitoring for an intrusion of an object to be detected on the basis of the received modulation wave. The sensor device includes: a reference clock generator that generates a reference clock signal; a light output unit that is connected to an output terminal of the reference clock generator so as to convert the reference clock signal generated by the reference clock generator into an optical signal and output the converted optical signal to an external device; a light input unit that inputs a reference clock signal of an optical signal from an external device and converts the reference clock signal into a reference clock signal of an electrical signal; and a switchover switch that selectively supplies either one of the reference clock signal generated by the reference clock generator and the reference clock signal from the external device, which is an output of the light input unit, to the transmission spectrum diffusion signal generator. The transmission spectrum diffusion signal generator generates the transmission spectrum diffusion signal on the basis of a reference clock signal selectively supplied via the switchover switch.

The present fourth embodiment also provides an electric wave-based intruder detection device having an interference suppression function, which is an interference wave suppression device in an electric wave-based intrusion detection system. The intruder detection device includes: a light output unit for converting a reference clock signal into an optical signal and outputs the optical signal; a light input unit for converting a reference clock signal, which has been converted into the optical signal and supplied from an external device, into a clock signal; and an optical cable for supplying the reference clock signal between the present devices.

Fifth Embodiment

Figure 15:
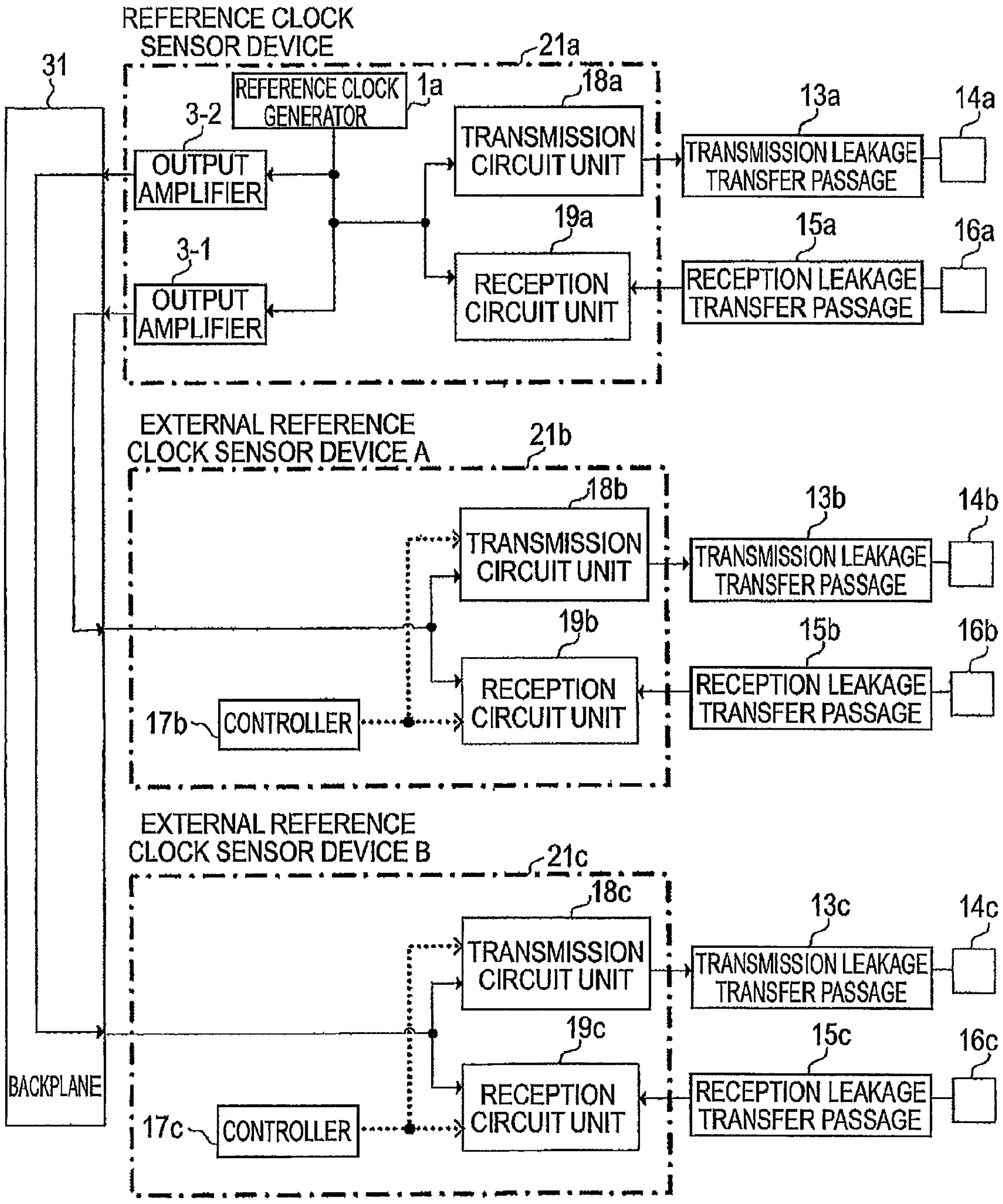
FIG. 15 is a system configuration diagram illustrating a still further example of an intrusion detection system according to the fifth embodiment of the present invention.

The fifth embodiment will be described with reference to FIG. 15 which illustrates a still further example of an intrusion detection system.

The first to fourth embodiments described above have been described for an example in which the intrusion detection system can be applied to a case where the sensor devices are connected together by the coaxial cable or the optical cable, and the respective sensor devices are installed at different locations or boards. In the fifth embodiment, as shown in FIG. 10, a clock signal which is obtained by the output amplifier 3-1, 3-2 amplifying the output of the reference clock generator 1*a* is supplied to the second and third sensor devices 21*b* and 21*c* via a backplane 31 which is formed of a printed board.

The output of the reference clock generator 1 may be used as the reference clock signal of the first to third sensor devices 32-1 to 32-3 by mounting the reference clock generator 1 and the output amplifiers 3-1 to 3-3 on the backplane 31 formed of the printed board and connecting the first to third sensor devices 32-1 to 32-3 together using connectors. In such a case, a plurality of sensor devices can be accommodated in the same unit, thus achieving a size-reduction.

As described above, the present fifth embodiment provides an intrusion detection system in which an output of the reference clock generator is supplied to the second sensor device via a printed board.

The present fifth embodiment also provides an electric wave-based intruder detection device having an interference suppression function, which is an interference wave suppression device in an electric wave-based intrusion detection system, and in which a plurality of present devices is connected by a backplane which is formed of a printed board and is provided with a reference clock generator and an output amplifier.

The same reference numerals in the respective figures of FIGS. 1 to 16 designate the same or corresponding portions.

Various modifications and alterations of this invention will be apparent to those skilled in the art without departing from the scope and spirit of this invention, and it should be understood that this is not limited to the illustrative embodiments set forth herein.

What is claimed is:

1. An intrusion detection system comprising a first sensor device and a second sensor device, in which:

the first sensor device includes a first transmission circuit unit that transmits a modulation wave of a first transmission spectrum diffusion signal to a first transmission leakage transfer passage, and a first reception circuit unit that receives the modulation wave of the first transmission spectrum diffusion signal having leaked from the first transmission leakage transfer passage to a first reception leakage transfer passage so as to detect an intrusion of an object to be detected into an area subject to monitoring for an intrusion of an object to be detected on the basis of the received modulation wave; and the second sensor device includes a second transmission circuit unit that transmits a modulation wave of a second transmission spectrum diffusion signal to a second transmission leakage transfer passage, and a second reception circuit unit that receives the modulation wave of the second transmission spectrum diffusion signal having leaked from the second transmission leakage transfer passage to a second reception leakage transfer passage so as to detect an intrusion of an object to be detected into an area subject to monitoring for an intrusion of an object to be detected on the basis of the received modulation wave, wherein a signal interval of the first transmission spectrum diffusion signal is the same as a signal interval of the second transmission spectrum diffusion signal, and wherein the first transmission spectrum diffusion signal and the second transmission spectrum diffusion signal are shifted in frequency so that the first transmission spectrum diffusion signal does not overlap with the second transmission spectrum diffusion signal.

2. The intrusion detection system according to claim 1, wherein the first transmission spectrum diffusion signal and the second transmission spectrum diffusion signal are generated on the basis of the same reference clock signal.

3. The intrusion detection system according to claim 2, wherein the reference clock signal is a clock signal which is output from one reference clock generator.

4. The intrusion detection system according to claim 1, wherein the first transmission spectrum diffusion signal and the second transmission spectrum diffusion signal are shifted in frequency by a frequency smaller than a signal interval Δf of the transmission spectrum diffusion signals.

5. The intrusion detection system according to claim 3, wherein the first transmission spectrum diffusion signal and the second transmission spectrum diffusion signal are shifted in frequency by a frequency smaller than a signal interval Δf of the transmission spectrum diffusion signals.

6. The intrusion detection system according to claim 3, wherein the reference clock generator is provided to the first sensor device, and an output of the reference clock generator is supplied to the second sensor device as a reference clock signal via a non-leaking coaxial cable.

7. The intrusion detection system according to claim 4, wherein the reference clock generator is provided to the first sensor device, and an output of the reference clock generator is supplied to the second sensor device as a reference clock signal via a non-leaking coaxial cable.

8. The intrusion detection system according to claim 5, wherein the reference clock generator is provided to the first sensor device, and an output of the reference clock generator is supplied to the second sensor device as a reference clock signal via a non-leaking coaxial cable.

9. The intrusion detection system according to claim 3, wherein a clock signal which is obtained by a light output unit converting an output of the reference clock generator into an optical signal is transmitted to a light input unit and converted into an electrical signal, and the transmission spectrum diffusion signal is generated on the basis of a clock signal which is obtained by the light input unit converting the optical signal into the electrical signal.

10. The intrusion detection system according to claim 4, wherein a clock signal which is obtained by a light output unit converting an output of the reference clock generator into an optical signal is transmitted to a light input unit and converted into an electrical signal, and the transmission spectrum diffusion signal is generated on the basis of a clock signal which is obtained by the light input unit converting the optical signal into the electrical signal.

11. The intrusion detection system according to claim 5, wherein a clock signal which is obtained by a light output unit converting an output of the reference clock generator into an optical signal is transmitted to a light input unit and converted into an electrical signal, and the transmission spectrum diffusion signal is generated on the basis of a clock signal which is obtained by the light input unit converting the optical signal into the electrical signal.

12. The intrusion detection system according to claim 3, wherein an output of the reference clock generator is supplied to the second sensor device via a printed board.

13. The intrusion detection system according to claim 4, wherein an output of the reference clock generator is supplied to the second sensor device via a printed board.

14. The intrusion detection system according to claim 5, wherein an output of the reference clock generator is supplied to the second sensor device via a printed board.

15. A sensor device that transmits a modulation wave of a transmission spectrum diffusion signal to a transmission leakage transfer passage, receives the modulation wave having leaked from the transmission leakage transfer passage to a reception leakage transfer passage, and detects an intrusion of an object to be detected into an area subject to monitoring for an intrusion of an object to be detected on the basis of the received modulation wave, the sensor device comprising:

a reference clock generator that generates a reference clock signal;

a light output unit that is connected to an output terminal of the reference clock generator so as to convert the reference clock signal generated by the reference clock generator into an optical signal and output the converted optical signal to an external device;

a light input unit that inputs a reference clock signal of an optical signal from an external device and converts the reference clock signal into a reference clock signal of an electrical signal; and a switchover switch that selectively supplies either one of the reference clock signal generated by the reference clock generator and the reference clock signal from the external device, which is an output of the light input unit, to the transmission spectrum diffusion signal generator, wherein the transmission spectrum diffusion signal generator generates the transmission spectrum diffusion signal on the basis of a reference clock signal selectively supplied via the switchover switch.

* * * * *